D. B. Munger.
Bean Harvester.
No. 47320   Patented Apr. 18, 1865.

Witnesses   Inventor

UNITED STATES PATENT OFFICE.

D. B. MUNGER, OF MUMFORD, NEW YORK.

IMPROVEMENT IN BEAN-HARVESTERS.

Specification forming part of Letters Patent No. 47,320, dated April 18, 1865.

*To all whom it may concern:*

Be it known that I, D. B. MUNGER, of Mumford, in the county of Monroe and State of New York, have invented certain new and useful Improvements in Bean Pullers or Harvesters; and I do hereby declare that the following is a full, clear, and exact description thereof, reference being had to the accompanying drawings, making part of this specification, in which—

Figure 1:
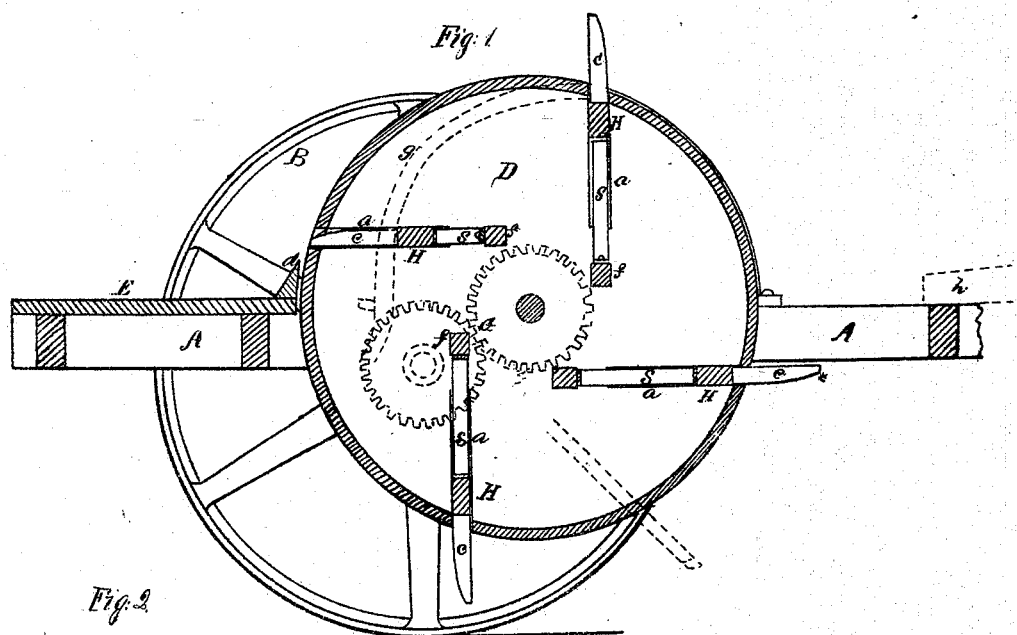
Figure 2:
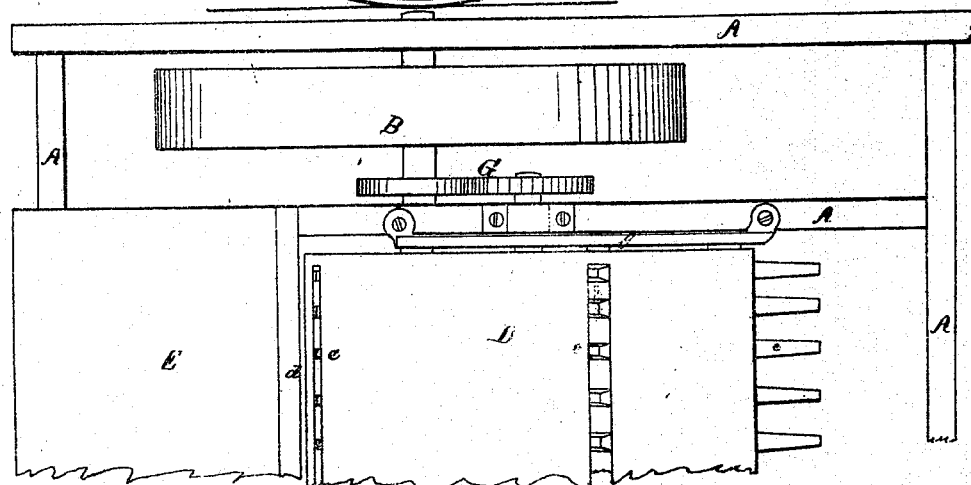
Figure 3:
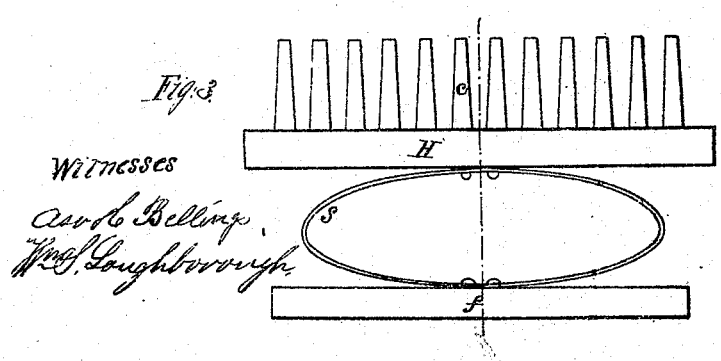

Figure 1 is a vertical section of my invention. Fig. 2 is a top view of the same portion. Fig. 3 is a detached view of one of the rake-heads or pullers, with its teeth $c$, spring $s$, and the bar $f$, to which the spring is attached.

Similar letters of reference indicate corresponding parts.

This invention consists, mainly, in arranging a series of rake or puller heads within a revolving cylinder in such a manner that by means of springs and cam-guides, the latter being rigidly fixed to the frame of the machine, the heads shall each have a centrifugal and centripetal movement at each revolution of the drum or cylinder, and also in giving the heads a tangential reciprocating movement.

To enable others to work my invention, I will describe its construction and operation.

I mount a suitable frame, A, upon two carrier or ground wheels, B. Between these wheels and upon the same frame is hung a drum, D, which may be geared to one or both of the ground-wheels by the spur-gearing G. The heads of the drum D are provided with slots $a$ for the ends of the puller-heads H to work through. These slots may be made radial or tangential, as shown in the drawings, or circular, if desired. Either of the latter positions causes more of a lifting stroke or movement to the teeth $c$ as they operate upon the standing beans. The heads H are thrown out by the elliptic spring $s$; or convolute springs may be substituted for the elliptics. The inward movement of the heads is effected by the cam-guides $g$, arranged at each end of the drum. These guides are rigidly attached to the frame and so set as to cause the teeth $c$ to recede within the drum as they approach the divider $d$ of the platform E, upon which the beans are deposited, and thereby effect a perfect and entire delivery of the collections of each rake or puller. The springs $s$ are bolted to the puller-heads H and to the bars $f$, which are attached to the heads of the drum.

It will be seen that by employing the springs to throw the pullers out they are permitted to recede, if they happen to strike a fixed substance, and thus pass over it without injury, whereas, if a fixed guide were used for this purpose, the action of the pullers would of course be arbitrary, and breakage would be the result, as above mentioned.

The ends of the heads H may be provided with friction-rollers, if desired, to work against the guides $g$.

The drum D may be made of wood or iron, and with skeleton heads, if preferred.

The speed of the drum D may be about equal to that of the ground or driving wheels B when their relative diameters are about as shown in the drawings. The teeth of the pullers are made somewhat tapering, as shown in Fig. 3, that the stalks received between them shall tend to wedge fast, and also that the delivery shall be more readily effected. The beans may be discharged from the platform in gavels of any desired size.

The tongue or thills, as the case may be, for either may be used, is attached to the cross-bars of the frame, as indicated by the dotted lines $h$, Fig. 1.

What I claim as my invention, and desire to secure by Letters Patent, is—

1. The cam-guides $g$, in combination with the puller-heads H, substantially as and for the purposes set forth.

2. In combination with the cam-guides $g$ and puller-heads H, the springs $s$, or their equivalents, for the purposes specified.

D. B. MUNGER.

Witnesses:
ASA H. BILLINGS,
WM. S. LOUGHBOROUGH.